US009365751B2

(12) United States Patent
Suen

(10) Patent No.: US 9,365,751 B2
(45) Date of Patent: Jun. 14, 2016

(54) REACTIVE HOT MELT ADHESIVE

(71) Applicant: Henkel Corporation, Rocky Hill, CT (US)

(72) Inventor: Wu Suen, Flemington, NJ (US)

(73) Assignee: Henkel IP & Holding GmbH, Duesseldorf (DE)

( * ) Notice: Subject to any disclaimer, the term of this patent is extended or adjusted under 35 U.S.C. 154(b) by 266 days.

(21) Appl. No.: 13/839,138

(22) Filed: Mar. 15, 2013

(65) Prior Publication Data

US 2014/0027056 A1 Jan. 30, 2014

Related U.S. Application Data

(60) Provisional application No. 61/438,644, filed on Dec. 18, 2012, provisional application No. 61/674,884, filed on Jul. 24, 2012.

(51) Int. Cl.

| | |
|---|---|
| *C09J 11/06* | (2006.01) |
| *C09J 5/06* | (2006.01) |
| *C08G 18/28* | (2006.01) |
| *C09J 175/04* | (2006.01) |
| *C09J 201/10* | (2006.01) |
| *C08K 5/01* | (2006.01) |
| *C08K 5/5425* | (2006.01) |
| *C08L 91/06* | (2006.01) |
| *C08L 93/04* | (2006.01) |

(52) U.S. Cl.
CPC ............... *C09J 11/06* (2013.01); *C08G 18/289* (2013.01); *C09J 5/06* (2013.01); *C09J 175/04* (2013.01); *C09J 201/10* (2013.01); *C08G 2170/20* (2013.01); *C08K 5/01* (2013.01); *C08K 5/5425* (2013.01); *C08L 91/06* (2013.01); *C08L 93/04* (2013.01)

(58) Field of Classification Search
CPC .......................................................... C09J 11/06
USPC ........................................................ 524/270
See application file for complete search history.

(56) References Cited

U.S. PATENT DOCUMENTS

| | | | |
|---|---|---|---|
| 4,593,068 A | | 6/1986 | Hirose et al. |
| 4,783,504 A | | 11/1988 | St. Clair et al. |
| 4,871,590 A | | 10/1989 | Merz et al. |
| 5,097,053 A | | 3/1992 | Baghdachi et al. |
| 5,210,150 A | | 5/1993 | Prejean |
| 5,241,014 A | | 8/1993 | Kehr et al. |
| 5,331,049 A | | 7/1994 | Audett et al. |
| 5,346,939 A | | 9/1994 | Moren et al. |
| 5,472,785 A | * | 12/1995 | Stobbie et al. ............. 428/423.1 |
| 5,604,033 A | | 2/1997 | Arthurs et al. |
| 5,669,940 A | | 9/1997 | Stubbs |
| 5,994,474 A | | 11/1999 | Wey et al. |
| 6,121,354 A | | 9/2000 | Chronister |
| 6,204,350 B1 | | 3/2001 | Liu et al. |
| 6,303,731 B1 | | 10/2001 | Carlson et al. |
| 6,350,345 B1 | | 2/2002 | Kotani et al. |
| 6,433,055 B1 | | 8/2002 | Kleyer et al. |
| 6,437,071 B1 | | 8/2002 | Odaka et al. |
| 6,437,072 B1 | | 8/2002 | Jyono et al. |
| 6,444,775 B1 | | 9/2002 | Jyono et al. |
| 6,613,816 B2 | | 9/2003 | Mahdi et al. |
| 6,642,309 B2 | | 11/2003 | Komitsu et al. |
| 6,649,016 B2 | | 11/2003 | Wu et al. |
| 6,664,323 B2 | | 12/2003 | Lucas |
| 6,749,943 B1 | | 6/2004 | Tangen et al. |
| 6,777,485 B1 | | 8/2004 | Ito et al. |
| 6,803,412 B2 | | 10/2004 | Nguyen-Misra et al. |
| 6,828,403 B2 | | 12/2004 | Mahdi et al. |
| 6,967,226 B2 | | 11/2005 | Shah |
| 7,067,563 B2 | | 6/2006 | Klein et al. |
| 7,087,127 B2 | | 8/2006 | Mahdi et al. |
| 7,091,298 B2 | | 8/2006 | Schindler et al. |
| 7,153,911 B2 | | 12/2006 | Yano et al. |
| 8,101,681 B2 | | 1/2012 | Kohl et al. |
| 8,362,123 B2 | | 1/2013 | Kohl et al. |
| 8,399,102 B2 | | 3/2013 | Oertli et al. |
| 2002/0084030 A1 | | 7/2002 | Kotani et al. |
| 2005/0043455 A1 | | 2/2005 | Hohner |
| 2005/0215702 A1 | | 9/2005 | Slark et al. |
| 2006/0142532 A1 | | 6/2006 | Wintermantel et al. |
| 2008/0125539 A1 | | 5/2008 | Mack |
| 2008/0312401 A1 | | 12/2008 | Sato et al. |
| 2009/0000549 A1 | | 1/2009 | Wang et al. |
| 2009/0226740 A1 | | 9/2009 | Teysseire |
| 2014/0329074 A1 | | 11/2014 | Janke et al. |
| 2015/0240135 A1 | | 8/2015 | Janke et al. |

FOREIGN PATENT DOCUMENTS

| | | |
|---|---|---|
| CN | 102516921 A | 6/2012 |
| DE | 4000695 A1 | 7/1991 |
| DE | 19516457 A1 | 11/1995 |

(Continued)

OTHER PUBLICATIONS

International Search Report issued in connection with International Patent Application No. PCT/US2010/061207 mailed Aug. 31, 2011.
C.W. Paul, "Hot Melt Adhesives", in Adhesion Science and Engineering-2, Surfaces, Chemistry and Applications, Chapter 15, pp. 711-757, M. Chaudhury and A.V. Pocius eds., Elsevier, New York (2002).
Michael J. Owen, "Coupling Agents: chemical bonding at interfaces", in Adhesion Science and Engineering-2, Surfaces, Chemistry and Applications, Chapter 9, pp. 403-431, M. Chaudhury and A.V. Pocius eds., Elsevier, New York (2002).

(Continued)

*Primary Examiner* — Doris Lee

(74) *Attorney, Agent, or Firm* — James E. Piotrowski

(57) ABSTRACT

The present invention relates to silane reactive hot melt adhesive compositions having improved green strength, the production of such adhesives and the use of such adhesives.

16 Claims, No Drawings

(56) References Cited

FOREIGN PATENT DOCUMENTS

| | | |
|---|---|---|
| DE | 102004055450 A1 | 5/2006 |
| EP | 0310704 A2 | 4/1989 |
| EP | 1788035 A1 | 5/2007 |
| GB | 2197326 A | 5/1988 |
| GB | 2292154 A | 2/1996 |
| JP | S60235747 A | 11/1985 |
| JP | H01163281 A | 6/1989 |
| JP | H01301740 A | 12/1989 |
| JP | 02150488 A | 6/1990 |
| JP | H04335080 A | 11/1992 |
| JP | 10251357 A | 9/1998 |
| JP | 3030020 B1 | 4/2000 |
| JP | 4176028 | 6/2004 |
| JP | 3621678 B2 | 2/2005 |
| JP | 2006291021 A | 10/2006 |
| JP | 2006523253 A | 10/2006 |
| JP | 2009024107 A | 2/2009 |
| WO | 8911506 A1 | 11/1989 |
| WO | 8911514 A1 | 11/1989 |
| WO | 9001507 A1 | 2/1990 |
| WO | 9106580 A1 | 5/1991 |
| WO | 9108240 A1 | 6/1991 |
| WO | 2006028927 A1 | 3/2006 |
| WO | 2007122261 A1 | 11/2007 |
| WO | 2008116033 A1 | 9/2008 |
| WO | 2010033383 A1 | 3/2010 |
| WO | 2011087741 A2 | 7/2011 |
| WO | WO 2011 087741 * | 7/2011 |
| WO | 2014072396 A1 | 5/2014 |

OTHER PUBLICATIONS

International Search Report for International Application No. PCT/US2008/072590 mailed Dec. 3, 2008.

* cited by examiner

REACTIVE HOT MELT ADHESIVE

FIELD OF THE INVENTION

This invention relates to silane reactive hot melt adhesive compositions having improved green strength, the production of such adhesives and the use of such adhesives.

BACKGROUND OF THE INVENTION

Hot melt adhesive compositions are solid at room temperature but, upon application of heat, melt to a liquid or fluid state in which molten form they are applied to a substrate. On cooling, the adhesive composition regains its solid form. The hard phase(s) formed upon cooling the adhesive composition impart all of the cohesion (strength, toughness, creep and heat resistance) to the final bond. Hot melt adhesive compositions are thermoplastic and can be heated to a fluid state and cooled to a solid state repeatedly. Hot melt adhesive compositions do not include water or solvents.

Curable or reactive hot melt adhesive compositions are also solid at room temperature and, upon application of heat, melt to a liquid or fluid state in which molten form they are applied to a substrate. On cooling, the adhesive composition regains its solid form. The hard phase(s) formed upon cooling the adhesive composition and prior to curing impart initial or green strength to the bond. The adhesive composition will cure by a chemical crosslinking reaction upon exposure to suitable conditions such as exposure to moisture. Before curing the adhesive composition remains thermoplastic and can be remelted and resolidified. Once cured, the adhesive composition is in an irreversible solid form and is no longer thermoplastic. The crosslinked adhesive composition provides additional strength, toughness, creep and heat resistance to the final bond. Hot melt curable adhesive compositions can provide higher strength and heat resistance compared to non-curable hot melt adhesive compositions.

The ability of a reactive hot melt adhesive composition to cool so that the solidified but non-crosslinked composition can quickly bond parts together is called green strength. An adhesive composition that quickly develops green strength is desirable in commercial operations as it allows bonded parts to be further processed quickly. Reactive hot melt adhesive compositions will continue to react with moisture so that strength of the adhesive bond between parts will continue to rise. A high cured strength is desirable in commercial operations as it allows stressed parts to be bonded. In some applications such as roller coating the adhesive composition is melted in the reservoir of roller coating equipment and applied as a thin film by a roller to a substrate. The molten adhesive composition in the roller coating equipment will react with moisture in the air and begin to crosslink. At some time the cross linking will progress to a point where the equipment must be shut down so the partially cross linked adhesive composition can be removed and the equipment cleaned. Failure to clean the partially crosslinked adhesive composition can lead to application difficulties and ultimately to the composition fully curing and solidifying in the equipment, requiring equipment shutdown and extensive disassembly. Thus, a long working life is desirable. Some adhesive compositions will form a string between the just coated substrate and application equipment as the coated substrate is removed from the equipment. These hot adhesive strings are undesirable as they accumulate on the equipment and require cleaning. Thus, minimizing stringing is desirable. These requirements are conflicting. An adhesive composition that crosslinks quickly to provide cured strength will have a short working life. An adhesive composition that crosslinks slowly will have a long working life but will develop strength more slowly, slowing subsequent commercial operations. It can be difficult to find one reactive hot melt adhesive composition that has a commercially desirable combination of green strength, cured strength, working life and stringing The majority of reactive hot melts are moisture-curing urethane hot melt compositions. The reactive components of urethane hot melt compositions consist primarily of isocyanate terminated polyurethane prepolymers containing urethane groups and reactive isocyanate groups that react with surface or atmospheric moisture to chain extend and form a new polyurethane polymer. Polyurethane prepolymers are conventionally obtained by reacting diols with diisocyanates. Upon cooling the isocyanate groups in the polyurethane prepolymer react with moisture from the environment to form a crosslinked irreversible solid bond.

Moisture-curing urethane hot melt adhesive compositions have certain disadvantages. One disadvantage is the residual monomer content of polyisocyanates, more particularly the more volatile diisocyanates. Some moisture-curing urethane hot melt adhesive compositions can contain significant amounts of unreacted monomeric diisocyanates. At the hot melt application temperature (typically at 100° C. to 170° C.) monomeric diisocyanates have a considerable vapor pressure and may be partly expelled in gaseous form. The isocyanate vapors may be toxic, irritating and have a sensitizing effect, so that precautionary measures have to be taken in the application process.

Silane reactive hot melt adhesive compositions have been developed to replace isocyanate reactive hot melt compositions. Silane reactive hot melt adhesive compositions are also solid at room temperature and, upon application of heat, melt to a liquid or fluid state in which molten form they are applied to a substrate. On cooling, the composition regains its solid form. Silane reactive hot melt adhesive compositions are based on silane modified polymers that comprise moisture reactive silane groups that form siloxane bonds when exposed to moisture such as in the atmosphere. Silane reactive hot melt adhesive compositions offer good cured adhesion and since there is no isocyanate there are no concerns about emission of isocyanate monomer vapor. However, silane reactive hot melt adhesive compositions develop green strength slower than reactive polyurethane hot melt adhesive compositions.

There remains a need for a silane reactive hot melt adhesive composition that has a desirable combination of properties for commercial use including quick development of green strength, a long working life and high final (cured) strength.

BRIEF SUMMARY OF THE INVENTION

It has been discovered that a silane reactive hot melt adhesive composition comprising a silane modified polymer and an effective amount of acidic functional wax develops green strength more quickly and has an extended working life as compared to the same silane modified hot melt adhesive composition without the acidic functional wax. One embodiment is directed to a silane reactive hot melt adhesive composition comprising a silane modified polymer, an effective amount of acidic functional wax and a silane adhesion promoter.

Another embodiment is directed to a method of increasing the development of green strength in a silane reactive hot melt adhesive composition by adding an effective amount of acidic functional wax.

Another embodiment is directed to a method for bonding materials together which comprises applying the silane reactive hot melt adhesive composition in a molten form to a first substrate, bringing a second substrate in contact with the molten composition applied to the first substrate, and subjecting the applied composition to conditions which will allow the composition to cool and cure to an irreversible solid form, said conditions comprising moisture.

Another embodiment is directed to an article of manufacture comprising a substrate bonded to cured reaction products of a silane reactive hot melt adhesive composition prepared from a silane modified polymer and a controlled range of acidic functional wax.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION OF THE INVENTION

The disclosures of all documents cited herein are incorporated in their entireties by reference.

As used herein, "irreversible solid form" means a solid form wherein the silane reactive hot melt adhesive composition has reacted with moisture to produce a cured, thermoset, insoluble material.

The silane reactive hot melt adhesive composition comprises one or more silane modified polymers. The silane modified polymer has an organic backbone, bearing one or more terminal or pendant silane or alkoxylated silane groups. The silane groups are hydrolyzed by water to silanol groups, which can condense with each other or with reactive species on the adherent surfaces. The silane modified polymer may be prepared with one or more of a variety of polymer backbones such as polyurethane (for example derived from Baycoll 2458 from Bayer), polyether, polyester, polyetherester, polyester-ether, polyolefin, polycaprolactone, polyacrylate, polybutadiene, polycarbonate, polyacetal, polyester amide, polythioether, polyolefin and the like. Advantageous backbones for the silane modified polymer include polyurethane and polyether and especially acrylate modified polyether (prepared for instance as described in U.S. Pat. No. 6,350,345, the contents of which are incorporated reference). The silane modified polymer backbone can be free of silicon atoms. The silane modified polymer can be a low modulus silane modified polymer having a Young's modulus for the cured, neat polymer lower than 50 psi; a high modulus silane modified polymer having a Young's modulus for the cured, neat polymer equal or greater than 50 psi; or a combination of low modulus silane modified polymer and high modulus silane modified polymer.

The silane modified polymer can be represented by the formula

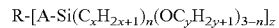

$$R\text{-}[A\text{-}Si(C_xH_{2x+1})_n(OC_yH_{2y+1})_{3-n}]_z$$

wherein R is the organic backbone;
A is a linkage that links the silane to polymer backbone R;
n=0, 1 or 2;
x and y are, independently a number from 1 to 12.

The number of silane groups z will preferably be more than one per molecule (to generate a fully cured network), and more preferably at least two per molecule. More preferably, the silane functional polymer is telechelic or end-functionalized, where most or all the ends are silane functional. The number of silyl ether groups per silane end group, 3-n, is preferably 2 or 3 (n=1 or 0). The silane reactive hot melt adhesive composition cures during exposure to water or moisture, when the silane groups are hydrolyzed to silanol groups which can condense with each other or with reactive species on the adherent surfaces.

Silane modified polymers are commercially available, for example, from Momentive Performance Material under the trade name SPUR, from Henkel Corporation under the trade name FLEXTEC and from Kaneka Corporation under the trade name MS polymer and SILIL polymer.

The silane modified polymer is advantageously liquid at room temperature to provide more rapid reaction of the silane end groups in the silane reactive hot melt adhesive composition and to aid mobility of the reactive sites and thus increase the potential for covalent reaction with the surface of one or both substrates.

The amount of silane modified polymer in the composition will depend on its molecular weight and functionality, but will typically be from 20-80 wt %, advantageously 25-60 wt %, and more advantageously from 30-50 wt %, based on the total weight of the adhesive composition.

The silane reactive hot melt adhesive composition comprises a controlled amount of acidic functional wax. By "acidic functional wax" it is meant that the wax includes a functional moiety that is acidic. The acidic functional wax can have terminal or pendant acidic functional moieties.

Ullmann's Encyclopedia of Industrial Chemistry, the contents of which are incorporated by reference herein, describes waxes. Examples of types of waxes that may be used include natural waxes, partially synthetic waxes and fully synthetic waxes. Natural waxes are formed through biochemical processes and are products of animal or plant metabolism. Partially synthetic waxes are formed by chemically reacting natural waxes. Fully synthetic waxes are prepared by polymerizing low molar mass starting materials such as carbon, methane, ethane or propane. The two main groups of fully synthetic waxes are the Fischer-Tropsch waxes and polyolefin waxes such as polyethylene wax, polypropylene wax and copolymers thereof.

Acidic functional groups are added to the wax molecule by, for example, grafting synthetic waxes with an acidic moiety such as carboxylic acid or maleic anhydride or by cleavage of the esters and/or oxidation of the alcohols in partially synthetic waxes. Acidic functional waxes can have a saponification number (mg KOH/gm wax) of less than about 90 and more advantageously from about 5 to about 30. Some useful acid functional maleated waxes can have about 50% to about 95% of maleic anhydride moieties bound to the wax backbone with the remaining with the remaining maleic anhydride content not bound to the wax backbone.

Acidic functional waxes are available commercially, for example from Clariant International Ltd, Switzerland; EPChem International Pte Ltd, Singapore; Honeywell International Inc., U.S. and Westlake Chemical Corp, U.S. Advantageous acid functional waxes are the maleated polypropylene waxes. One useful maleated polypropylene wax is A-C 1325P available from Honeywell International Inc.

The silane reactive hot melt adhesive composition will contain an effective amount of acid functional wax. An effective amount of acid functional wax is the amount of acid functional wax that will increase green strength of a silyl reactive hot melt adhesive composition without deleteriously degrading other properties of that composition. Surprisingly, while some amount of wax is required to more quickly provide green strength to the silane reactive hot melt adhesive composition the use of too much wax can deleteriously degrade properties of the composition such as cured strength. Thus, the amount of acid functional wax in the silane reactive hot melt adhesive composition must be kept in a controlled range. The silane reactive hot melt adhesive composition will contain 0.1% to about 15% of acid functional wax. Advantageously, the silane reactive hot melt adhesive composition will contain 0.1% to about 4% of acid functional wax.

The silane reactive hot melt adhesive composition can optionally comprise tackifier. The choice of tackifier will depend on the backbone of the silane modified polymer. The tackifier choices include natural and petroleum-derived materials and combinations thereof as described in C. W. Paul, "Hot Melt Adhesives," in Adhesion Science and Engineering-2, Surfaces, Chemistry and Applications, M. Chaudhury and A. V. Pocius eds., Elsevier, New York, 2002, p. 718, incorporated by reference herein.

Useful tackifier for the adhesive composition of the invention includes natural and modified rosin, aromatic tackifier or mixtures thereof. Useful natural and modified rosins include gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin. Examples of commercially available rosins and rosin derivatives that could be used to practice the invention include Sylvalite RE 110L, Sylvares RE 115, and Sylvares RE 104 available from Arizona Chemical; Dertocal 140 from DRT; Limed Rosin No. 1, GB-120, and Pencel C from Arakawa Chemical. One preferred natural and modified rosin is a rosin ester tackifier such as KE-100, available from Arakawa Chemical Co. Another preferred rosin ester tackifier is a Komotac 2110 from Komo Resins. Useful aromatic tackifiers include styrenic monomers, styrene, alpha-methyl styrene, vinyl toluene, methoxy styrene, tertiary butyl styrene, chlorostyrene, coumarone, indene monomers including indene, and methyl indene. Preferred are aromatic hydrocarbon resins that are phenolic-modified aromatic resins, $C_9$ hydrocarbon resins, aliphatic-modified aromatic $C_9$ hydrocarbon resins, $C_9$ aromatic/aliphatic olefin-derived and available from Sartomer and Cray Valley under the trade name Norsolene and from Rutgers series of TK aromatic hydrocarbon resins. Other preferred aromatic tackifiers are alpha-methyl styrene types such as Kristalex 3100, Kristalex 5140 or Hercolite 240, all available from Eastman Chemical Co.

The tackifier component will usually be present in an amount of from about 20 wt % to about 90 wt %, advantageously from about 25 wt % to about 45 wt %, more advantageously from about 30 wt % to about 40 wt %, based on the total weight of the adhesive composition. The rosin tackifier will be present from 0 to 30 wt %, advantageously from about 3 to about 20 wt %, based on the total weight of the adhesive composition. The aromatic tackifier will be present from 0 to about 60 wt %, advantageously from about 15 to about 40 wt %, based on the total weight of the adhesive composition.

The silane reactive hot melt adhesive composition can optionally comprise an acrylic polymer or copolymer (acrylic polymer). The acrylic polymer can improve green strength of the cooled hot melt adhesive composition. The acrylic polymer can be either a silane-reactive polymer or non-reactive polymer. A silane reactive polymer comprises groups such as carboxylic acid, amine, thiol and hydroxyl that react with silane moieties. A preferred silane reactive group is carboxylic acid. The number of groups should be sufficient such that a significant amount, at least 5%, of the acrylic polymer is grafted to the silane modified polymer via the silane groups. A non-silane reactive acrylic polymer does not include groups that are reactive with the silane modified polymer.

One useful reactive acrylic polymer is Elvacite 2903 from INEOS Acrylics. Elvacite 2903 is a solid acrylic copolymer comprising acid and hydroxyl groups, has an acid number 5.2 and hydroxyl number of 9.5.

The amount of solid acrylic polymer in the adhesive composition will depend on a number of factors, including the glass transition temperature and molecular weight of the acrylic polymer, but will typically be present in an amount of from about 10 to about 45 wt %, based on the total weight of the adhesive composition.

The silane reactive hot melt adhesive composition can optionally comprise a catalyst. Suitable curing agents for the silane groups are described in U.S. Patent Publication No. 2002/0084030, and incorporated by reference herein. Exemplary catalyst includes bismuth compounds such as bismuth carboxylate; organic tin catalysts such as dimethyltin dineodecanoate, dibutyltin oxide and dibutyltin diacetate; titanium alkoxides (TYZOR® types, available from DuPont); tertiary amines such as bis (2-morpholinoethyl) ether, 2,2'-Dimorpholino Diethyl Ether (DMDEE) and triethylene diamine; zirconium complexes (KAT XC6212, K-KAT XC-A209 available from King Industries, Inc.); aluminum chelates (K-KAT 5218, K-KAT 4205 available from King Industries, Inc.), KR types (available from Kenrich Petrochemical, Inc.); and other organometallic compounds based on Zn, Co, Ni, and Fe and the like. The level of catalyst in the silane reactive hot melt adhesive composition will depend on the type of catalyst used, but can range from about 0.05 to about 5 wt %, advantageously from about 0.1 to about 3 wt % and more advantageously from about 0.1 to about 2 wt %, based on the total weight of the adhesive composition.

The silane reactive hot melt adhesive composition can optionally comprise a moisture scavenger to extend pot life, such as vinyl trimethoxy silane or methacryloxypropyltrimethoxysilane. The level of moisture scavenger employed can be from 0 to 3% and preferably from 0 to 2%, based on the total weight of the adhesive composition.

The adhesive composition can comprise an adhesion promoter or coupling agent which promotes bonding of the composition to a substrate. Examples are described in: Michel J. Owen, "*Coupling agents: chemical bonding at interfaces*", in Adhesion Science and Engineering-2, Surfaces, Chemistry and Applications, M. Chaudhury and A. V. Pocius eds., Elsevier, New York, 2002, p. 403, incorporated by reference herein. Preferred adhesion promoters include organo-silanes which can link the silane-functional polymer to the surface such as amino silanes and epoxy silanes. Some exemplary aminosilane adhesion promoters include 3-aminopropyltrimethoxysilane, 3-aminopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltrimethoxysilane, 1-butanamino-4-(dimethoxymethylsilyl)-2,2-dimethyl, (N-cyclohexylaminomethyl)triethoxysilane, (N-cyclohexylaminomethyl)-methyldiethoxysilane, (N-phenylaminoethyl)trimethoxysilane, (N-phenylaminomethyl)-methyldimethoxysilane or .gamma.-ureidopropyltrialkoxysilane. Particularly preferred amino silanes include 3-aminopropyltrimethoxysilane, 3-aminopropyltriethoxysilane. Some exemplary epoxy silane adhesion promoters include 3-glycidyloxypropyltrimethoxysilane, 3-glycidyloxypropyltriethoxysilane or beta-(3,4-epoxycyclohexyl)ethyltrimethoxysilane. Other silane adhesion promoters include mercaptosilanes. Some exemplary mercaptosilane adhesion promoters include 3-mercaptopropyltrimethoxysilane, 3-mercaptopropylmethyldimethoxysilane or 3-mercaptopropyltriethoxysilane. The level of adhesion promoter employed can be from 0 to 10%, preferably 0.1 to 5% and more preferably 0.2-3%. The adhesion promoter, if more reactive to moisture than the silane modified polymer, can also serve as a moisture scavenger.

Surprisingly, a silane reactive hot melt adhesive composition comprising aminosilane adhesion promoter and having a ratio (R) of acid functionality to aminosilane functionality within a limited range has proven to provide an advantageous combination of green strength, final (cured) strength and working life. R is defined as the molar ratio between acid functionality from acid functional wax and amino functionality from aminosilane. For maleic anhydride modified wax, each maleic anhydride functional group will generate 2 carboxylic acid functionalities. This is due to anhydride chemistry and well known to people in the art.

R is defined as R1/R2.

For Maleic Anhydride modified wax, $R1$=Number of mili mole of acid functionality=Saponification No(mg KOH/g)/56.11.

For aminosilane adhesion promoter, $R2$=Number of mili mole of amino functionality=weight of aminosilane×1000/179.

Advantageously, R is greater than 0 and less than about 1.8. More advantageously, R may be in the range of about 0.3 to about 1.2.

The silane reactive hot melt adhesive composition can optionally comprise conventional additives known to a person skilled in the art. Conventional additives which are compatible with a composition according to this invention may simply be determined by combining a potential additive with the composition and determining if they remain homogenous. Non-limiting examples of suitable additives include, without limitation, fillers, plasticizers, defoamers, rheology modifiers, air release agents and flame retardants.

The total level of additives will vary depending on amount of each particular additive needed to provide the silane reactive hot melt adhesive composition with desired properties. The level of additives can be from 0 to 50%.

An exemplary silane reactive hot melt adhesive composition is shown below.

| component | range (wt %) | preferred range (wt %) |
|---|---|---|
| silane modified polymer | 20-80 | 30-60 |
| acidic functional wax | 0.1-15 | 0.5-8 |
| natural and modified rosin tackifier | 0-30 | 3-20 |
| aromatic tackifier | 0-60 | 10-35 |
| acrylic polymer | 10-45 | 15-35 |
| catalyst | 0.05-5 | 0.05-2 |
| moisture scavenger | 0-3 | 0-1.5 |
| adhesion promoter | 0-10 | 0.1-2 |
| additives | 0-50 | 5-40 |
| R | 0.1-1.8 | 0.3-1.2 |

The silane reactive hot melt adhesive composition is preferably free of water and/or solvent in either the solid and/or molten form.

The silane reactive hot melt adhesive composition can be prepared by mixing the tackifier, wax and other non-reactive components with heat until homogeneously blended. The mixer is placed under vacuum to remove moisture followed by heated mixing of the reactive components.

The silane reactive hot melt adhesive compositions can be used to bond articles together by applying the hot melt adhesive composition in molten form to a first article, bringing a second article in contact with the molten composition applied to the first article. After application of the second article the silane reactive hot melt adhesive composition is subjected to conditions that will allow it to solidify, bonding the first and second articles. Solidification occurs when the liquid melt is subjected to a temperature below the melting point, typically room temperature. Bonding based on solidification and before cure is referred to as green strength. After solidification the adhesive is exposed to conditions such as surface or atmospheric moisture to cure the solidified composition to an irreversible solid form.

The silane reactive hot melt adhesive compositions are useful for bonding articles composed of a wide variety of substrates (materials), including but not limited to wood, metal, polymeric plastics, glass and textiles. Non-limiting uses include use in the manufacture of footwear (shoes), use in the manufacture of doors including entry doors, garage doors and the like, use in the manufacture of panels, use in bonding components on the exterior of vehicles, and the like.

Application temperatures of the silane reactive hot melt adhesive compositions are determined by the thermal stability of the composition and the heat sensitivity of the substrates. Preferred application temperatures are above 120° C. and below 170° C., more preferably below 150° C., and most preferably below 140° C.

The silane reactive hot melt adhesive compositions may be then applied in molten form to substrates using a variety of application techniques known in the art. Examples includes hot melt glue gun, hot melt slot-die coating, hot melt wheel coating, hot melt roller coating, melt blown coating, spiral spray and the like. In preferred embodiments the hot melt adhesive composition is applied to a substrate using hot melt roller coater or extruded onto a substrate.

The invention is further illustrated by the following non-limiting examples.

EXAMPLES

The following tests were used in the Examples.

Acid number (ASTM D-1386)—Standard Test Method for Acid Number (Empirical) of Synthetic and Natural Waxes Saponification number (ASTM D-1387)—Standard Test Method for Saponification Number (Empirical) of Synthetic and Natural Waxes Viscosity—viscosity was measured using a Brookfield viscometer with a Thermosel heating unit and spindle 27. Desirably, viscosity of the silane reactive hot melt adhesive composition should be 5,000 to 20,000 cps at 250° F.

Stringiness—Visual evaluation of adhesive composition strings extending between a recently coated substrate and the roller coating apparatus. Desirably, stringiness of the silane reactive hot melt adhesive composition should be no greater than moderate.

Final (cured) strength by Lap Shear Adhesion Test (TLS)—The adhesive was applied to a clean PVC substrate. A stainless steel drawdown applicator (BYK-Gardner) was used to obtain a controlled thickness of 0.020 inches. Glass bead spacers 0.010 in thick were sprinkled on top of the adhesive layer to control the final bondline thickness. Clean glass strips 1 inch by 4 inches were bonded to the applied adhesive with an overlapping area of 1 inch by 1 inch using hand pressure. The finished bonds were conditioned at 72° F./50% RH for two weeks before testing to allow for full moisture cure. Tensile samples were pulled along the long axis at 0.5 inches/min until failure in an Instron tensile test machine either at room temperature or immediately after heating the sample for 0.5 hr in an oven at 180° F. Desirably, on glass to PVC substrates, final strength of the silane reactive hot melt adhesive composition should be greater than 60 psi at room temperature and greater than 20 psi at 180° F.

Green Strength by TLS—Lap shear bonds were made and tested as described above, but were tested largely uncured a short time (2 hours to one week) after bonding. This test characterizes the ability of the bonded structure to survive handling in manufacture prior to full cure. Hot melts have the advantage of high strength in the green state which minimizes working inventory.

Green Strength by Cantilever Pull Test (CPT)—Two, 12 inch by 2 inch by 0.5 inch thick freshly planed (within 24 hours) pine substrates are provided. One substrate is roll coated with 10 grams/foot$^2$ of molten adhesive. The second specimen is placed on the coated specimen so that there is a 3 inch by 2 inch overlap area and the overlapping area is lightly pressed. The bonded substrates are allowed to sit for a short time (typically 5 minutes, 10 minutes or 1 hour) to allow the adhesive to solidify. One substrate is fixed and an increasing force is applied in the thickness direction (perpendicular to the length and width directions) until the bond fails.

Working life—The time required for the molten silane reactive hot melt composition when exposed to atmospheric moisture of 20% to 80% relative humidity to gel sufficiently to require removal from the roller coating apparatus. Working life is visually determined by formation of gelled lump portions in the molten silane reactive hot melt composition of about 2 to 6 inches.

The following materials were used in the Examples.

A-C 1325P a maleated polypropylene wax available from Honeywell International Inc. The manufacturer states that A-C 1325P has 78% bound maleic anhydride; a saponification number of 18 mg KOH/gm wax; and a viscosity of 1600 cps at 190° C.

A-C 596P a maleated polypropylene wax available from Honeywell International Inc. The manufacturer states that A-C 596P has 85% bound maleic anhydride; a saponification number of 50 mg KOH/gm wax; and a viscosity of 150 cps at 190° C.

MAX 951 is a low modulus silane terminated polyether, commercially available from Kaneka Corp.

DMDEE is a bis (2-morpholinoethyl) ether available from VWR Inc.

Elvacite 2903 is a solid acrylic polymer, available from Ineos Acrylics.

KE-100 is a hydrogenated rosin ester, available from Arakawa Chemical Co.

Kristalex 3100 is an alpha-methyl styrene tackifier, available from Eastman Chemical Co.

Silquest A-174 is a moisture scavenger, available from Momentive Performance Materials.

Silquest A1110 is an adhesion promoter, available from Momentive Performance Materials.

KBM503 is an adhesion promoter, available from Shin Etsu Silicone.

A515 is an air release agent, available from BYK Chemie.

Example 1

Samples of silane reactive hot melt adhesive compositions were prepared according to the following table. Sample A is a comparative example with no acid functionalized wax. The air release agent, acrylic polymer and tackifiers were combined, heated to 305° F. and stirred until homogeneous. Vacuum was applied to remove any water and the temperature was lowered to 280° F. When the temperature reached 280° F. the silane modified polymer was added and vacuum mixed until homogeneous. The 3-methacryloxypropyltrimethoxysilane and adhesion promoter were added and vacuum mixed until homogeneous. The catalyst was added and vacuum mixed until homogeneous. The final adhesive was poured into a container, cooled to room temperature and sealed under nitrogen.

| Material | Sample (wt %) | | | | | |
| --- | --- | --- | --- | --- | --- | --- |
| | A | 1 | 2 | 3 | 4 | 5 |
| silane modified polymer[1] | 43 | 43 | 43 | 41.5 | 42 | 40 |
| tackifier[2] | 26 | 26 | 26 | 25 | 25 | 24 |
| acrylic polymer[3] | 22 | 22 | 21 | 21 | 21 | 20 |
| tackifier[4] | 6 | 6 | 6 | 5.9 | 6 | 6 |
| 3-methacryloxypropyltrimethoxysilane[5] | .9 | 0.9 | 0.9 | 0.9 | 0.9 | 0.9 |
| air release agent[6] | .4 | 0.4 | 0.4 | 0.4 | 0.4 | 0.4 |
| adhesion promoter[7] | .2 | 0.2 | 0.2 | 0.2 | 0.1 | 0.1 |
| catalyst[8] | .2 | 0.2 | 0.2 | 0.2 | 0.2 | 0.2 |
| acid functional wax[9] | 0 | 1.2 | 2.4 | 4.7 | 4.8 | 9.1 |
| R (molar ratio of acid functionality/amine) | 0 | 0.38 | 0.92 | 1.15 | 1.84 | 3.68 |

[1]Max 951
[2]Krystalex 3100
[3]Elvacite 2903
[4]KE100
[5]KBM503
[6]A515
[7]Silquest A1110
[8]DMDEE
[9]AC1325P

|  | Sample | | | | | |
|---|---|---|---|---|---|---|
| Property | A | 1 | 2 | 3 | 4 | 5 |
| R | 0 | 0.38 | 0.92 | 1.15 | 1.84 | 3.68 |
| Clarity | clear | | clear | | clear | clear |
| Viscosity (cps @ 250° F.) | 6763 | 14050 | 8325 | 10250 | 8925 | 9700 |
| Stringiness | very high | very high | moderate | | very high | moderate |
| Green strength CTP (lbs) | | | | | | |
| 5 min | 13 | 19 | 21 | 22 | 23 | 16 |
| 1 hr | 23 | 30 | 22 | 34.5 | 32 | 23 |
| 2 hr | 27 | 36 | 28 | 37 | 25 | 24 |
| Final strength TLS (psi) glass/PVC | | | | | | |
| Room temperature | 138 | 115 | 125 | 126 | 19 | 4 |
| 180° F. | 27 | 18 | 20 | 25 | 0 | — |
| working life (mins) | 40 | 26 | 60 | 50 | >60 | >60 |

Sample A with no acid functional wax (R=0) had an unacceptably low green strength of 13 lbs at 5 minutes. Sample 2 (2.4% acid functional wax and R=0.92) had an acceptable green strength of 21 pounds, a long working life of 60 minutes and a good final (cured) room temperature strength of 125 psi. Sample 3 (R=1.15) also gave satisfactory results. Sample 4 (R=1.84) and Sample 5 (R=3.68) both had unacceptably low final (cured) room temperature strengths below 19 psi (room temperature) 0 psi (180F).

Example 2

Samples of silane reactive hot melt adhesive compositions were prepared according to the following table. Sample A is a comparative example with no acid functionalized wax.

|  | Sample (wt %) | | |
|---|---|---|---|
| Material | A | 6 | 7 |
| silane modified polymer[1] | 43 | 42 | 42 |
| tackifier[2] | 26 | 25 | 25 |
| acrylic polymer[3] | 22 | 21 | 21 |
| tackifier[4] | 6 | 6 | 6 |
| 3-methacryloxypropyltrimethoxysilane[5] | .9 | .9 | .9 |
| air release agent[6] | .4 | .4 | .4 |
| adhesion promoter[7] | .2 | .1 | .1 |
| catalyst[8] | .2 | .2 | .2 |
| acid functional wax[9] | 0 | 4.8 | 9.1 |
| R (molar ratio of acid functionality/amine) | 0 | 5.11 | 10.22 |

[1] Max 951
[2] Krystalex 3100
[3] Elvacite 2903
[4] KE100
[5] KBM503
[6] A515
[7] Silquest A1110
[8] DMDEE
[9] AC596P

|  | Sample | | |
|---|---|---|---|
| Property | A | 6 | 7 |
| Clarity | clear | clear | clear |
| Viscosity (cps @ 250° F.) | 6763 | 6413 | 8250 |
| Stringiness | very high | moderate | low |

-continued

|  | Sample | | |
|---|---|---|---|
| Property | A | 6 | 7 |
| Green strength CTP (lbs) | | | |
| 5 min | 13 | 23 | 24 |
| 1 hr | 23 | 34 | 28 |
| 2 hr | 27 | 34 | 28 |
| Final strength TLS (psi) glass/PVC | | | |
| Room temperature | 138 | 3 | 6 |
| 180° F. | 27 | 0 | 0 |
| working life (mins) | 40 | >60 | >60 |

AC596P used in samples 6 and 7 is a maleated polypropylene wax with a saponification number of 50 mg KOH/g wax. Thus, AC596P has a higher maleic anhydride content than the AC1325P wax used in samples 1-5. Sample 6 (4.8 wt % acid functional wax and R=5.11) and Sample 7 (9.1 wt % acid functional wax and R=10.22) both had good green strength and working life but both had unacceptably low final (cured) strength.

The effect of amount of acid functional wax on green strength is also seen when tested by tensile lap shear (TLS). The following Table illustrates TLS green strength for a number of different test substrates.

|  | Sample | |
|---|---|---|
|  | A | 3 |
| Green Strength TLS (lbs) | | |
| R | 0 | 1.15 |
| HPL to CRS | | |
| 2 hours | 3.5 | 22.5 |
| 24 hours | 3.3 | 32 |
| 1 week | 34.2 | 60.3 |
| HPL to PB | | |
| 2 hours | 4 | 40 |
| 24 hours | 8 | 39.5 |
| 1 week | 47 | 110 |
| SMC to SMC | | |
| 2 hours | 3.4 | 22 |
| 24 hours | 4 | 41 |

-continued

| | Sample | |
|---|---|---|
| | A | 3 |
| 1 week | 45.4 | 93.1 |

Test substrate:
HPL is high pressure laminate.
CRS is cold rolled steel.
PB is particle board.
SMC is sheet molding composite.

There is a very significant improvement in green strength between Sample A (adhesive with no wax) and Sample 3 (adhesive comprising acid functional wax). As shown in the above Table strength development is much faster with sample 3.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A silane reactive hot melt adhesive composition comprising:
a silane modified polymer; 0.1 wt % to 15 wt % of acid functional wax; and an aminosilane adhesion promoter wherein the molar ratio of acid functionality from the acid functional wax and amino functionality of the aminosilane (R) is equal to or less than 1.8.

2. The silane reactive hot melt adhesive composition of claim 1 wherein the molar ratio of acid functionality from the acid functional wax and amino functionality of the aminosilane (R) is about 0.3 to about 1.2.

3. The silane reactive hot melt adhesive composition of claim 1 being free of isocyanate functionality.

4. The silane reactive hot melt adhesive composition of claim 1 further comprising one or more of a tackifier selected from rosin ester, aromatic tackifier or mixtures thereof; an acrylic polymer; and a catalyst.

5. The silane reactive hot melt adhesive composition of claim 1, wherein the silane modified polymer is a liquid at room temperature and comprises at least one silyl group with a formula of $$A\text{-}Si(C_xH_{2x+1})_n(OC_yH_{2y+1})_{3-n},$$

wherein
A is a linkage to the silane modified polymer backbone;
x is 1 to 12;
y is 1 to 12; and
n is 0, 1 or 2.

6. The silane reactive hot melt adhesive composition of claim 1, wherein the silane modified polymer comprises a plurality of terminal silyl groups each independently having a formula of $$A\text{-}Si(C_xH_{2x+1})_n(OC_yH_{2y+1})_{3-n},$$

wherein
A is a linkage to the polymer backbone;
x is 1 to 12;
y is 1 to 12; and
n is 0, 1 or 2; and
the silyl group of the silane modified liquid polymer is end-functionalized.

7. The silane reactive hot melt adhesive composition of claim 1, wherein the silane modified polymer has a backbone structure selected from polyurethane, polyether, polyester, polyacrylate or polyolefin.

8. The silane reactive hot melt adhesive composition of claim 1, wherein the silane modified polymer has a formula $$R\text{-}[A\text{-}Si(C_xH_{2x+1})_n(OC_yH_{2y+1})_{3-n}]_z$$

wherein
R is an organic backbone of the silane modified polymer without silicon atoms,
A is a linkage that links the silane group to the polymer backbone R
n=0, 1 or 2;
x and y are, independently a number from 1 to 12; and
z is at least one.

9. The silane reactive hot melt adhesive composition of claim 1, wherein the silane modified polymer comprises a plurality of telechelic silyl groups each independently having a formula of $$A\text{-}Si(C_xH_{2x+1})_n(OC_yH_{2y+1})_{3-n},$$

wherein
A is a linkage to the polymer backbone;
x is 1 to 12;
y is 1 to 12; and
n is 0, 1 or 2.

10. The silane reactive hot melt adhesive composition of claim 1, further comprising a rosin tackifier selected from the group consisting of fully or partially hydrogenated rosin esters.

11. The silane reactive hot melt adhesive composition of claim 1, further comprising an aromatic tackifier selected from the group consisting of alpha-methyl styrene resins, $C_9$ hydrocarbon resins, aliphatic-modified aromatic $C_9$ hydrocarbon resins, phenolic-modified aromatic resins, $C_9$ aromatic/aliphatic olefin-derived resins, and mixtures thereof.

12. The silane reactive hot melt adhesive composition of claim 1, wherein the silane modified polymer is a low modulus silane modified liquid polymer.

13. The silane reactive hot melt adhesive composition of claim 1 being free of water and solvent.

14. The silane reactive hot melt adhesive composition of claim 1, wherein the acid functional wax is a maleated wax.

15. A method of applying a silane reactive hot melt adhesive composition comprising:
providing the silane reactive hot melt adhesive composition of claim 1 in solid form at room temperature;
heating the silane reactive hot melt adhesive composition to a molten state at the point of use;
applying the molten silane reactive hot melt adhesive composition to a first substrate;
bringing a second substrate in contact with the molten adhesive composition applied to the first substrate;
cooling the applied molten adhesive composition to a solid state;
subjecting the cooled adhesive composition to conditions sufficient to irreversibly cure the cooled adhesive composition to form a bond between the first and second substrates.

16. An article of manufacture comprising the silane reactive hot melt adhesive composition of claim 1.

* * * * *